United States Patent
Dawson

(10) Patent No.: US 11,645,708 B2
(45) Date of Patent: May 9, 2023

(54) SMART CONTRACT COMPLIANCE MONITORING AND ENFORCEMENT

(71) Applicant: PROMONTORY FINANCIAL GROUP, LLC, Washington, DC (US)

(72) Inventor: Michael Dawson, Minato-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 680 days.

(21) Appl. No.: 16/176,843

(22) Filed: Oct. 31, 2018

(65) Prior Publication Data

US 2020/0134711 A1   Apr. 30, 2020

(51) Int. Cl.
G06Q 40/02 (2023.01)
H04W 4/38 (2018.01)
H04L 9/06 (2006.01)

(52) U.S. Cl.
CPC ........... *G06Q 40/02* (2013.01); *H04L 9/0637* (2013.01); *H04W 4/38* (2018.02)

(58) Field of Classification Search
CPC ........ G06Q 40/02; H04W 4/38; H04L 9/0637
See application file for complete search history.

(56) References Cited

U.S. PATENT DOCUMENTS

| | | | |
|---|---|---|---|
| 8,022,844 B2 | 9/2011 | Knoska et al. | |
| 8,614,633 B1 | 12/2013 | Lear et al. | |
| 8,996,210 B2 | 3/2015 | Kish et al. | |
| 9,511,842 B2 | 12/2016 | Longson et al. | |
| 9,601,005 B2 | 3/2017 | Kusuno et al. | |
| 9,659,501 B2 | 5/2017 | Lee | |
| 9,842,504 B2 | 12/2017 | Short et al. | |
| 2005/0248454 A1 | 11/2005 | Hanson et al. | |
| 2015/0349917 A1* | 12/2015 | Skaaksrud | H04W 8/24 370/328 |
| 2016/0016646 A1 | 1/2016 | Mun et al. | |
| 2016/0069987 A1 | 3/2016 | Ise | |
| 2017/0253308 A1 | 9/2017 | Morita et al. | |
| 2017/0287090 A1* | 10/2017 | Hunn | G06Q 50/18 |
| 2017/0364748 A1 | 12/2017 | Maji et al. | |
| 2018/0144298 A1* | 5/2018 | Rankin | H04L 9/34 |

OTHER PUBLICATIONS

Ron White, How Computer Works, 7th Edition (Year: 2003).*
Hoyhtya, M. et al., "Connective For Autonomous Ships: Architecture, Use Cases, And Research Challenges", ICTC IEEE International Conference On, Oct. 18-20, 2017, pp. 345-350.

(Continued)

*Primary Examiner* — Patrick McAtee
*Assistant Examiner* — Vincent I Idiake
(74) *Attorney, Agent, or Firm* — Cuenot, Forsythe & Kim, LLC

(57) ABSTRACT

A smart contract clause can be generated with a processor communicatively coupled to a blockchain supported by a peer-to-peer network. The smart contract clause can be automatically invoked in response to a sensor-generated signal, wherein the sensor-generated signal corresponds to at least one or more predefined contract variance conditions. The smart contract clause can be embedded in a smart contract in the blockchain.

20 Claims, 6 Drawing Sheets

(56) References Cited

OTHER PUBLICATIONS

Loklindt, C. et al.; "How Blockchain Could Be Adopted For Exchanging Documentation In The Shipping Industry", Copenhagen Business School, Master's Thesis, May 5, 2017, pp. 1-115.
Francisconi, M., "An Exploration Study On Blockchain Technology In Application To Port Logistics", Delft University Of Technology, Aug. 21, 2017, pp. 1-115.
Fernandez et al.; "SmartPort: A Platform For Sensor Data Monitoring In A Seaport Based On FIWARE", Sensors, vol. 16, Issue 3, Mar. 22, 2016, pp. 1-24.
Mell, P. et al., The NIST Definition of Cloud Computing, National Institute of Standards and Technology, U.S. Dept. of Commerce, Special Publication 800-145, Sep. 2011, 7 pg.

\* cited by examiner

600

---

Generate, with processor communicatively coupled to blockchain supported in peer-to-peer network, smart contract clause that is automatically invoked in response to sensor-generated signal corresponding to contract variance condition.

602

---

Embed smart contract clause in smart contract.

```
┌─────────────────────────────────────────────────────────────┐
│ With processor communicatively coupled to blockchain in     │
│ ledger supported by peer-to-peer network, generate smart    │
│ contract clause that is automatically invoked in response   │
│ to sensor-generated signal corresponding to at least one    │
│ predefined contract variance condition.                     │
│                          702                                │
└─────────────────────────────────────────────────────────────┘
                              │
                              ▼
┌─────────────────────────────────────────────────────────────┐
│              Embed smart contract clause in smart contract. │
│                          704                                │
└─────────────────────────────────────────────────────────────┘
                              │
                              ▼
┌─────────────────────────────────────────────────────────────┐
│              Monitor activities and transactional events.   │
│                          706                                │
└─────────────────────────────────────────────────────────────┘
                              │
                              ▼
                      ◇ Contract Var Cond? ◇
                  N ←       708
                              │ Y
                              ▼
┌─────────────────────────────────────────────────────────────┐
│                   Invoke smart contract clause.             │
│                          710                                │
└─────────────────────────────────────────────────────────────┘
```

FIG. 7

SMART CONTRACT COMPLIANCE MONITORING AND ENFORCEMENT

BACKGROUND

The present invention relates to the field of data processing, and more particularly, to blockchain-based data processing.

Blockchain technology facilitates an efficient exchange of anything of value—goods services, money, and data. An aspect of blockchain technology is the distributed blockchain database, supported by an electronic ledger, that facilitates secure distribution and sharing of digital files over a network. Blockchain technology provides efficiency and security in the exchange of various types of transactional data, allowing more transactions to be executed more securely and more quickly. Use of blockchain technology is growing significantly across a broad range of industries ranging from healthcare to entertainment and media, and already is widely recognized as a technology particularly well-suited for handling various types of financial transactions.

SUMMARY

A method includes generating a smart contract clause with a processor communicatively coupled to a blockchain supported by a peer-to-peer network. The smart contract clause is automatically invoked in response to a sensor-generated signal, which corresponds to one or more predefined contract variance conditions. The method can include embedding the smart contract clause in a smart contract in the blockchain.

A system includes a processor programmed to initiate executable operations that include generating a smart contract clause with the processor communicatively coupled to a blockchain supported by a peer-to-peer network. The smart contract clause is automatically invoked in response to a sensor-generated signal. The sensor-generated signal corresponds one or more predefined contract variance conditions. The executable operations can also include embedding the smart contract clause in a smart contract in the blockchain.

A computer program product includes a computer readable storage medium having program code stored thereon. The program code is executable by a data processing system to initiate operations. The operations include automatically generating a smart contract clause with a processor in response to a sensor-generated signal, which corresponds to one or more predefined contract variance conditions. The operations can also include embedding the smart contract clause in a smart contract in the blockchain.

BRIEF DESCRIPTION OF THE DRAWINGS

FIG. 6 is a flowchart of a method of monitoring and enforcing smart contract compliance according to an embodiment of the present invention.

FIG. 7 is a flowchart of a method of monitoring and enforcing smart contract compliance according to another embodiment of the present invention.

DETAILED DESCRIPTION

Figure 1:
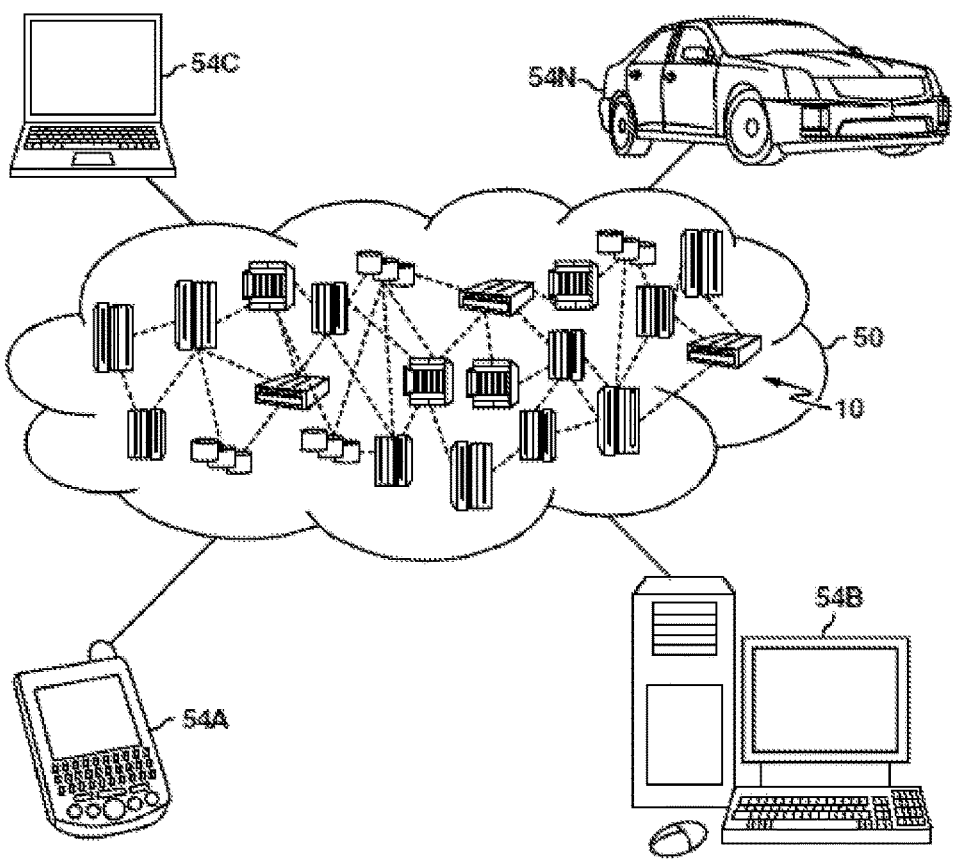
FIG. 1 depicts a cloud computing environment according to an embodiment of the present invention.

The present disclosure relates to data processing, and more particularly, to monitoring and enforcing a smart contract on a data processing network comprising a distributed peer-to-peer network supporting a blockchain.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
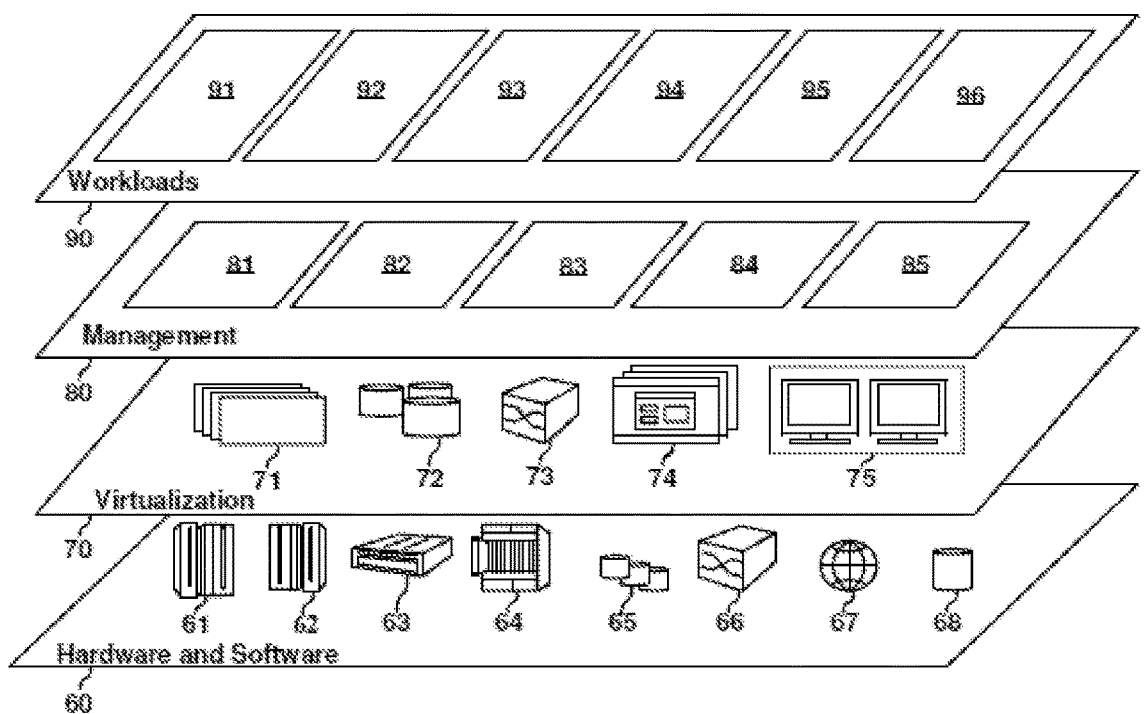
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components.

Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and executing transactions using a blockchain, such as with system 96 disclosed herein for monitoring and enforcing smart contracts.

System 96 can be implemented with a processor communicatively coupled to a blockchain supported by a peer-to-peer network. The blockchain is a dynamic list of data records organized as blocks, in which each successive block in the chain can be linked to a prior block using a cryptographic hash. The blockchain can be supported on an electronic ledger to which users can connect through a distributed protocol run by interconnected network nodes.

As used herein, "ledger" means a collection of electronic data that can be generated with a computer processor and stored in computer memory to provide a record, or log, of a sequence of transactions in a blockchain. A "transaction" means electronic data concerning a transactional event, action or document. "Embedding" means recording a transaction on the ledger. Recording data on the ledger corresponds to adding a data block to the blockchain. A "smart contract" refers to a protocol that defines assets and executes actions according to instructions given by parties to a transaction. An "asset" refers to anything of value that is characterized by a transaction-related state and asset ownership. Assets are represented in Hyperledger® Fabric, for example, as a collection of key-value pairs. (Hyperledger® Fabric, is a blockchain infrastructure that supports the IBM® Blockchain Platform.) A "blockchain channel" means a logical structure that is formed by a collection of peers.

System 96 generates a smart contract clause that can be embedded in a smart contract. The smart contact clause is automatically invoked in response to a sensor-generated signal corresponding to one or more predefined contract variance conditions. Contract variance conditions are defined by parties to a transaction governed by the smart contract. Specifically, if a contract variance condition occurs, then the sensor generates a corresponding signal that invokes the smart contract clause by system 96.

Predefined contract variance conditions can correspond to physically measurable conditions or physically observable events. These conditions and events can be detected using a sensor. The sensor can be any signal-generating device, including a transmitter, transducer, transponder, or other sensing device that senses a physical condition and responds by generating a signal indicating the sensed condition. A sensor-generated signal can be conveyed to system 96 via various channels, such as an electromagnetic-wave propagation channel, guided electromagnetic-wave channel, and optical channel. A signal can be conveyed to system 96 either directly by a sensor communicatively coupled to the system or indirectly via one or more intermediate relays. A signal received by system 96 can be a signal that the system converts to usable data, or a signal that comprises readily usable data generated by a source that is initially received as a sensor-generated signal and converted to usable data before conveying the sensor data to the system. In any event, the sensor-generated signal will correspond to a predefined contract condition variance to which the system 96 responds by automatically invoking a corresponding smart contract clause.

In one embodiment, system 96 can automatically embed the invocation of the smart contract clause in the smart contract. That is, system 96, ultimately responsive to the sensor-generated signal, can automatically generate a block of data indicating a contract variance condition occurred, and automatically insert the data block into the immutable block chain.

According to one embodiment, automatically invoking a smart contract clause in response to a sensor-generated signal automatically initiates a smart contract action. For example, parties to a smart contract can agree that one of the parties is to place monies in an escrow account to be transferred to another party in the event a contract variance condition occurs. If the contract variance condition occurs, the smart contract clause is invoked in response to the sensor-generated signal corresponding to the contract variance condition and system 96 automatically transfers ownership of the escrow account to the aggrieved party. The sequence of events is initiated when a sensor-generated signal indicates that the contract variance condition occurred. The smart contract clause is invoked, thereby triggering the transfer of ownership. Again, system 96 generates a data block memorializing the sequence of events, including the escrow account ownership transfer, and automatically inserts the data block into the immutable blockchain.

System 96 can be implemented in executable code. Accordingly, in a specific embodiment, system 96 is configured to direct the execution of instructions using the processor of a computing node, such as a cloud computing node.

Figure 3:
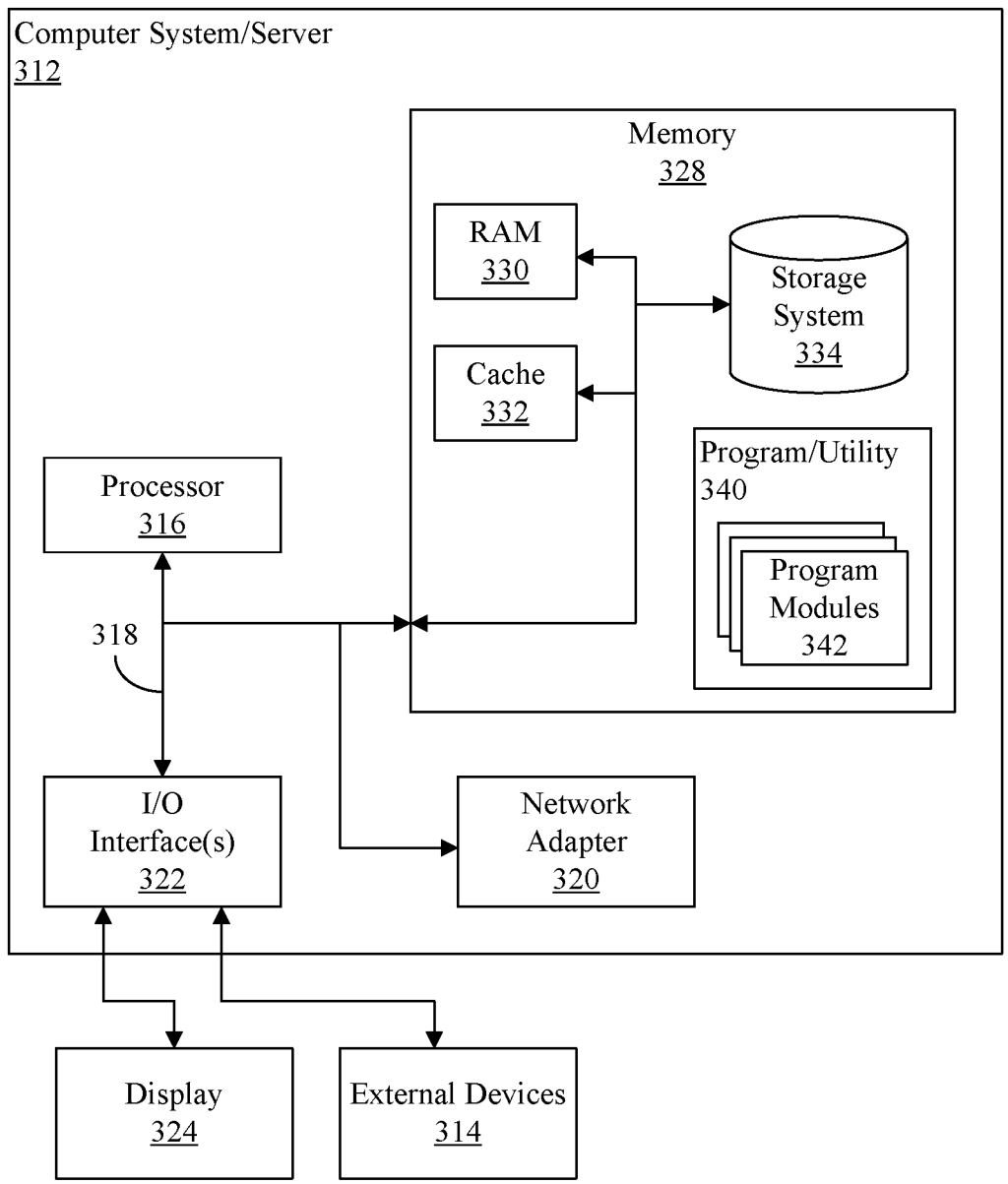
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes computer system/server 312, which is operational with numerous other general-purpose or special-purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform specific tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 3, computer system/server 312 in cloud computing node 300 is shown in the form of a general-purpose computing device. The components of computer system/server 312 may include, but are not limited to, one or more processors 316, memory 328, and bus 318, which couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and includes both volatile and non-volatile media, removable and non-removable media.

Memory 328 can include computer system readable media in the form of volatile memory, such as random-access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set of one or more program modules that are configured to carry out the functions of embodiments of the invention.

Program/utility 340, having a set of one or more program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may include blockchain system 96 or portions thereof. Program/utility 340 is executable by processing unit 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that, although not shown, other hardware and/or software components could be used in conjunction with computer system/server 312. Examples include, but are not limited to the following: microcode, device drivers, redundant processing units, external disk drive arrays, RAID systems, tape drives, and data archival storage systems, etc. While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

The operative features of system 96 are perhaps best described in the context of a specific transaction, such as a multiparty export-import transaction. In an export-import transaction, for example, an exporter agrees to deliver certain goods to a foreign importer, who in turn, agrees to pay the exporter.

In many such transactions, one or more parties is uncertain about another party's performance. To mitigate uncertainty, the parties can follow procedures, such as a procedure whereby the importer obtains a letter of credit from the importer's bank, which in turn, provides the letter of credit to the exporter. The exporter, in exchange for a bill of lading, consigns goods to a carrier for delivering the goods to the importer. The exporter presents the bill of lading to the exporter's bank in exchange for payment, and the exporter's bank presents the bill of lading to the importer's bank, which provides the bill to the importer. The buyer provides the bill of lading to the carrier and takes delivery of the goods.

Figure 4:
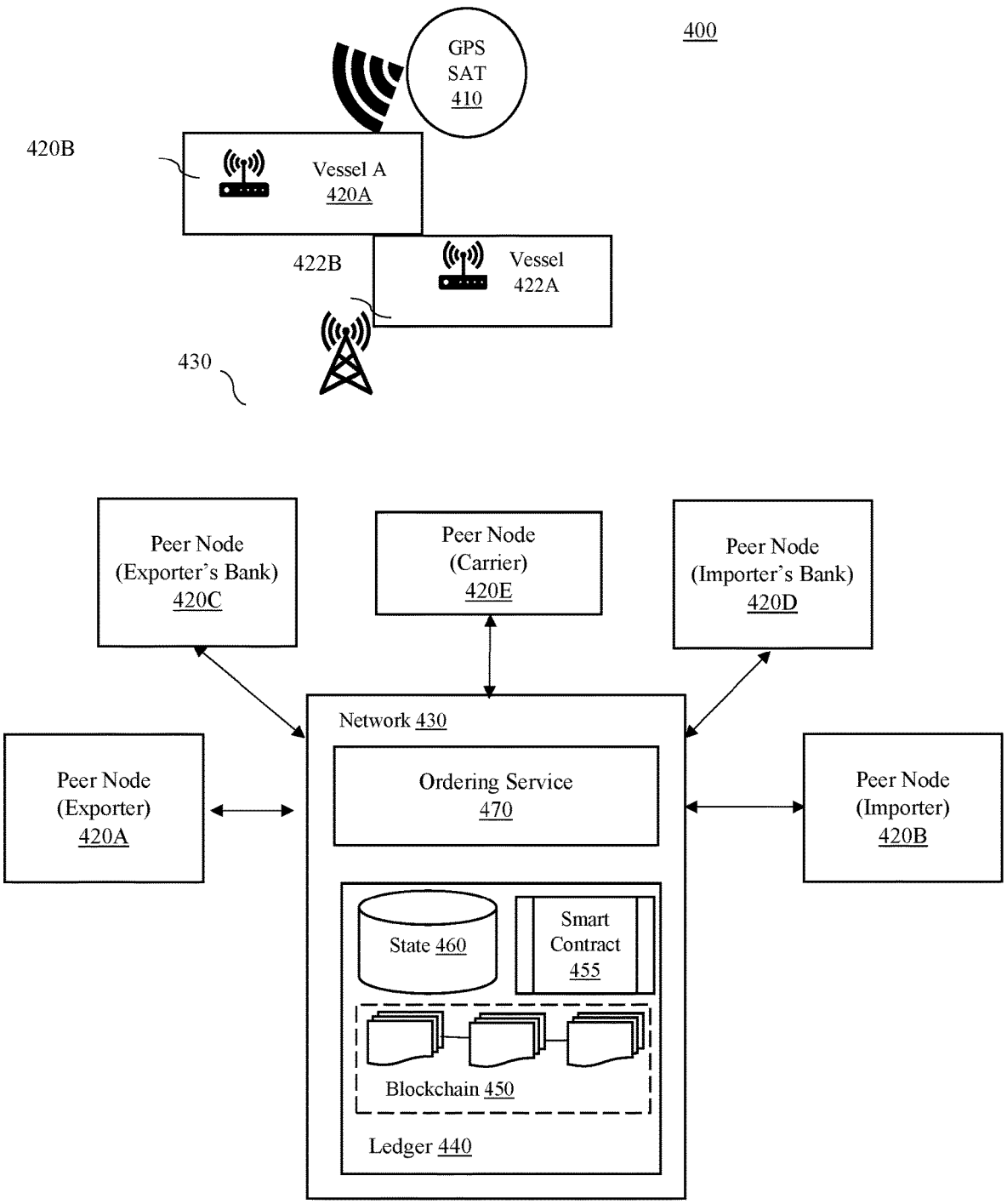
FIG. 4 depicts a transactional environment in which a system for monitoring and enforcing smart contract compliance can be used according to an embodiment of the present invention.

In this representative transaction it is assumed that the parties transact using a blockchain to streamline handling and presentment of the various documents. FIG. 4 depicts an example computing environment 400. The exporter operates peer node 420A. The importer operates peer node 420B. The exporter's bank and the importer's bank, respectively, operate peer nodes 420C and 420D. The carrier selected by the parties for transporting the goods operates peer node 420E. Peer nodes 420A, 420B, 420C, 420D, and 420E can be implemented, for example, in a computer system/server such as computer system/server 312 in FIG. 3. Each of peer nodes 420A, 420B, 420C, 420D, and 420E is communicatively coupled to peer-to-peer network 430. The network can be implemented in, or form part of, a cloud computing environment 50 as depicted in FIG. 1 in which the peer nodes 420A, 420B, 420C, 420D, and 420E are computing nodes 10 used by cloud consumers, as illustrated. Accordingly, a cloud consumer can refer to an entity or other actor in the computing environment 400. Examples of such users include, but are not limited to, financial institutions (e.g., banks, insurers, and the like) as well as other commercial entities (e.g., exporters, importers, and carriers).

Network 430 supports a blockchain infrastructure that includes electronic ledger 440 that is implemented in processor-executable code for recording transactional data in encrypted blocks of data, which are logically linked to form blockchain 450. (Though not explicitly delineated in the figure, ledger 440 can comprise multiple ledgers residing on one or more of the parties' respective nodes 420A, 420B, 420C, 420D, and 420E and/or on a trusted independent node.) The ledger supports smart contract 455, which provides a protocol defining assets and transaction in the blockchain. Smart contract 445 illustratively defines the parties' rights and obligations. The state of the ledger at any given moment in time is represented by stored data defining state 460 (e.g., the Hyperledger® Fabric world state).

Additionally, network 430 illustratively includes an ordering service 470 that packages transactions into blocks of data for delivery to the peer nodes 420A, 420B, 420C, 420D, 420E via a blockchain channel (a logical structure not explicitly shown). Ordering service 470 provides an ordering protocol for submitting to the ordering service messages that are delivered to peer nodes 420A, 420B, 420C, 420D, and 420E. For example, the Hyperledger® Fabric ordering service provides an atomic broadcast ordering protocol for submitting multiple messages to an ordering service, and in response, an ordered batch is delivered to the peer nodes. Ordering service 470 illustratively resides on a separate node (not explicitly shown) communicatively coupled to and part of network 430.

The parties can establish an endorsement policy that governs which party, or parties, can serve as an endorsing peer. An endorsing peer verifies that a valid digital signature or certificate accompanies peer-submitted data concerning a specific document or transactional event ("transaction") that is to be added as a data block to blockchain 450. A party can create a transaction, using a software development kit (SDK) (e.g., with respect to a Hyperledger® Fabric network, a Node.js or Java™ SDK) application program interface (API), and send the transaction to an endorsing peer. The endorsing peer verifies the digital signature and sends an endorsement signature. If the submitted transaction is endorsed, the transaction is submitted to ordering service 470. Otherwise the transaction is cancelled. Ordering service 470 delivers endorsed transactions to the other peers, all of whom commit and apply the same sequence of transactions to update their respective states.

The letter of credit and bill of lading provide some assurance of proper performance by the parties to the transaction, but some concerns may persist. For example, in the specific context of an international export-import transaction, additional concerns stem from various national or international regulations imposed on natural persons and entities including financial institutions, manufacturers, importers, exporters, ocean-going carriers, and port authorities. Some of these regulations flow from multilateral treaties, others are imposed by individual governments, and may prohibit trade in certain goods (e.g., weapons and dual-use technologies) or with certain countries (e.g., a country on which unilateral or multilateral sanctions are imposed). In view of such regulations, the exporter or importer and/or either of their banks is likely to demand that the carrier avoid certain ports of call and may demand that the carrier refrain from certain behavior, such as lingering too long at sea or too near another ship with the possibility of off-loading cargo or taking illicit cargo onboard.

Figure 5:
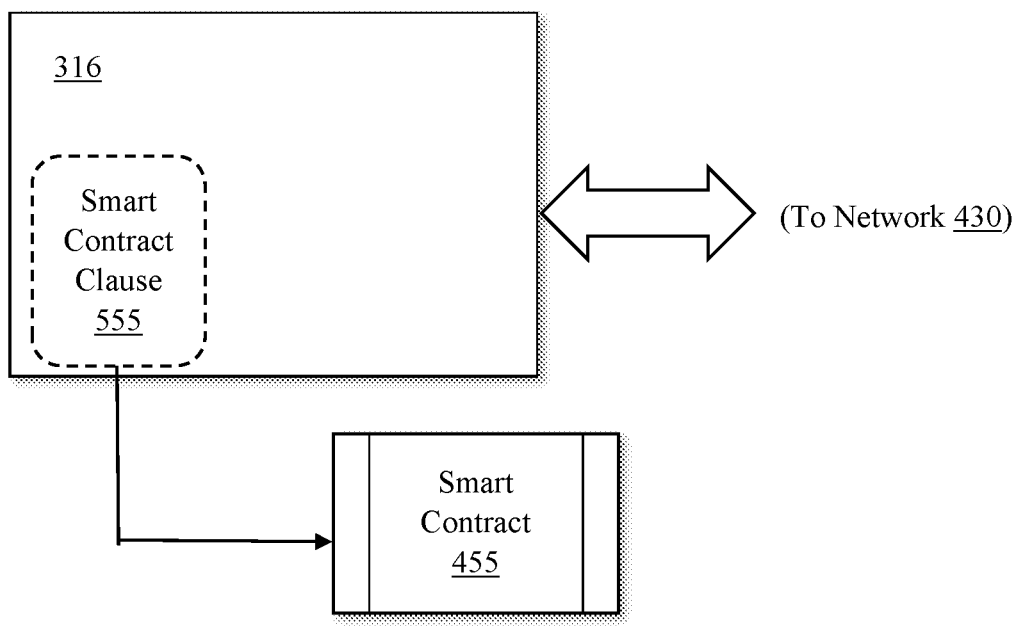
FIG. 5 depicts a system for monitoring and enforcing smart contract compliance according to an embodiment of the present invention.

System 96 extends the blockchain technology by providing an efficient mechanism within the framework of blockchain 450 to monitor and enforce the carrier's compliance with smart contract 455. Referring additionally now to FIG. 5, system 96 is implemented in a computer system/server that includes a processor, e.g., processor 316 of FIG. 3. Processor 316 communicatively couples with peer-to-peer network 430 and is programmed to initiate executable operations. System 96 can direct processor 316 to initiate executable instructions that include generating smart contract clause 555 that is automatically invoked if at least one predefined contract variance condition occurs. The smart contract clause 555 can be embedded by system 96 in smart contract 455.

A contract variance condition is an action or transactional event that the parties agree in advance is a breach or potential breach of smart contract 455 if the action or event occurs. The parties can define in advance several different transactional events or actions that are deemed contract variance conditions. System 96, through instructions executed on processor 316, can define a unique smart contract clause for each predefined contract variance condition. If a contract variance condition occurs, a smart contract clause is automatically invoked, the specific smart contract clause invoked being the one that corresponds to the specific contract variance condition.

Depending on the nature of an exchange governed by a smart contract, different transactional events or actions can constitute contract variance conditions. A response invoked by a contract variance condition depends on which contract variance condition occurred. For example, an action taken by one party to a smart contract can merely create uncertainty whether the party intends to perform according to the party's obligation under the contract. In another example, the action can be a complete repudiation or abrogation of the party's obligation. In the former situation, system 96 can automatically invoke a smart contract clause demanding that action be taken to remove the uncertainty. In the latter situation, system 96 can automatically invoke a smart contract clause declaring an irrevocable breach and cancelling the contract. In both situations, system 96 automatically records the event by generating a data block and embedding the data block in the blockchain. In yet another situation, system 96 can automatically initiate an action, such as the transfer of ownership of an asset (e.g., monies in an escrow account) from one party to another in response to a sensor-generated signal. Additionally, through instructions executed on processor 316, system 96 can notify one or more of the parties, through their respective peer nodes, which of the specific smart contract clauses has been invoked. Automatically invoking the smart contract clause and embedding the invocation thus makes the corresponding event a part of the immutable blockchain.

In one embodiment, system 96 includes a set of distinct smart contract clauses that can be stored in a computer memory (e.g., memory 328 of computing system/server 312 of FIG. 3). Using an I/O device (e.g., display 324 or external device 314 of computer system/server 312 of FIG. 3), a party to a smart contract can access a list of smart contract clauses contained in the memory-stored set. The parties can define different contract variance conditions and also select from the list the specific smart contract clauses that are to correspond to different predefined contract variance conditions. If a contract variance condition occurs, a specific one of the corresponding smart contract clauses is automatically invoked depending on which of the predefined contract variance conditions occurred. The action occurs automatically in response to an instruction executed by processor 316.

With respect to an automatic invocation of the smart contract clause, processor 316 can be programmed to record the event by creating a data block and adding the data block to ledger 440 automatically without peer endorsement. That is, the parties can agree that invocation of the smart contract clause will be embedded without endorsement. In another arrangement, an endorsement, as generally performed, can be a necessary condition.

System 96 extends blockchain technology along another dimension, as well, by determining whether and when a predefined contract variance condition occurs. Specifically, system 96 further includes processor-executable instructions that are initiated by processor 316 in response to a sensor-generated signal that corresponds to the occurrence of a predefined contract variance condition. System 96 automatically invokes a smart contract clause in response to the sensor-generated signal corresponding to an occurrence of a contract variance condition.

Predefined contract variance conditions can correspond to physically measurable conditions or physically observable events that can be detected by a sensor. The sensor can be any signal-generating device, such as a transmitter, transducer, transponder, or other sensing device that senses a physical condition and, in response, generates a signal corresponding to the sensed condition. A sensor-generated signal can be a radio frequency (RF) signal, microwave signal, or other electromagnetic transmission. A sensor-generated signal can be conveyed to system 96 via various channels, such as an electromagnetic-wave propagation channel, guided electromagnetic-wave channel, and optical channel. The signal can be conveyed to system 96 either directly by a sensor communicatively coupled to the system or indirectly via one or more intermediate relays.

A signal received by system 96 can be a raw signal that the system converts to usable data. Additionally, signal can comprise readily usable data generated by a source that initially receives a sensor-generated signal and converts the signal to usable data before conveying the data to system 96. In any event, the sensor-generated signal will correspond to a predefined contract condition variance to which the system 96 responds by automatically invoking a corresponding smart contract clause.

System 96 can be configured to demodulate a directly received, sensor-generated analog signal (e.g., RF, microwave, or other electromagnetic transmissions) to thereby convert the signal into a digital format that a computer can read and display on a monitor. Converted to digital form the data derived from the sensor-generated signal can be shared via the peer-to-peer network that supports the blockchain, the Internet, a local area network (LAN), or a wide area network (WAN) using a transmission control protocol (TCP), user datagram protocol (UDP) or other protocol as appropriate.

Accordingly, signals corresponding to contract variance conditions can be generated by a sensor that is located remotely from, and/or operating independently of, the peer-to-peer network supporting the blockchain. System 96 can monitor and analyze sensor-based information to determine whether and, if so, when a contract variance condition occurred. System 96 can analyze signals in real-time or near real-time. In other instances, these signals can be persisted in a data storage device (e.g., memory 328) that may be accessed by a computing node for later-time analysis by system 96.

For purposes of illustration, consider the representative export-import transaction illustrated in FIG. 4. Illustratively, transactional environment 400 further includes a global positioning satellite (GPS) 410 and two ocean-going vessels 420A, 422A with corresponding AIS transponders 420B, 422B, as well as a land-based transceiver 430. In this example, the transponders 420B, 422B are part of the Automatic Identification System (AIS) that, by mandate of the International Maritime Organization (IMO), are installed on ocean-going ships of more than a specified gross tonnage.

The AIS integrates a standard VHF transceiver with a positioning system such a GPS receiver and other electronic navigation sensors, such as gyrocompass or rate of turn indicator. AIS transmissions can be routed from transponder 420B of ship 420A to transponder 422B of ship 422A or directly to a land-based transceiver 430, as illustrated. The transmission can be conveyed via a communication link to one or more of the peer nodes 420A, 420B, 420C, 420D, and/or 420E for analysis by system 96. AIS transmissions indicate a ship's identity, location, speed and course over ground, as well as next port of call. Internet-disseminated AIS data is used by carriers and owners of goods-in-transit to track the progress of ship-borne cargo and anticipate port arrival times of ships. Additionally, satellite-based radar and other sources extend the scope of ship monitoring and maritime surveillance by detecting all vessels in specific maritime areas of interest.

In the context of the representative export-import transaction, system 96 can use AIS data or other signals (once converted to usable data) to ascertain where a ship is located and how long the ship is at a location. Using sensor-generated signals, system 96 can determine the ship's ports of call, and other ships in the ship's vicinity.

Thus, by periodically monitoring AIS transmissions, for example, system 96 can determine whether a carrier is creating a contract variance condition by allowing (or authorizing) a carrier-owned ship to engage in actions deemed suspicious (e.g., lingering too long at sea or too near another ship that there is the possibility of off-loading cargo or taking illicit cargo aboard). Likewise, system 96 can monitor AIS transmissions to ascertain whether the carrier's ship has put in at a prohibited port. Indeed, if the carrier's ship turns off the AIS, that alone can be deemed a suspicious activity giving rise to a contract variance condition. If, by monitoring and analyzing the AIS transmissions, the system 96 determines a contract variance condition exists or has occurred, appropriate automatic responses and actions are invoked as already described.

In other arrangements, in different contexts, different types of sensors can be utilized to monitor for the occurrence of events or actions deemed to be contract variance conditions. For example, another transactional context can involve a smart contract for building construction. A smart camera can be deployed and trained using a neural network or deep learning algorithm to classify images indicating suspicious or dangerous activity by a contractor or subcontractor. The specific activity could be deemed a contract variance condition by, for example a developer or insurer. The smart camera images can be conveyed via a communication link to a node of system 96. Using a processor communicatively coupled to a peer-to-peer network supporting a blockchain, system 96 can analyze the images and determine if a contract variance condition has occurred. System 96 automatically invokes the appropriate smart contract clause if the system determines from the image analysis that a contract variance condition has occurred.

Thus, according to any of several different embodiments, system 96, using processor 316 programmed to initiate executable operations and one or more of various types of sensors, can generate a smart contract clause and embed the clause in a smart contract in a blockchain. The smart contact clause is automatically invoked in response to a sensor-generated signal that corresponds to the occurrence of at least one predefined contract variance condition. That is, if a sensor generates a signal corresponding to a contract variance condition, then the smart contract clause can be automatically invoked by the system 96.

As described above, in one embodiment, the invocation of the smart contract clause can be automatically embedded in the smart contract by system 96 and thus made part of the immutable blockchain without endorsement. Alternatively, the standard procedure of endorsement prior adding a block of data to the blockchain can be followed, depending on agreement among the relevant parties.

According to other embodiments, system 96 additionally can automatically invoke additional actions in response to invocation of a smart contract clause. For example, if a smart contract clause is invoked, system 96 can automatically generate a notice of the invocation and send notice to one or more of the parties. In another embodiment, system 96 can automatically generate a demand that is conveyed to a specific party instructing the party to take some action to ameliorate a potential breach of the smart contract. In still another embodiment system 96 can generate a contract nullification or cancellation in response to invocation of a smart contract clause.

In yet another embodiment, system 96 can automatically initiate an action the parties previously agreed would be triggered in response to a contract variance condition. For example, one party can be required to deposit monies in an escrow account. In the event a predefined contract variance condition occurs, system 96 can automatically transfer ownership of the escrow account to the aggrieved party and/or transfer funds from the escrow account to the aggrieved party. In each instance, the system 96 responds to a sensor-generated signal corresponding to the specific contract variance condition and invokes the appropriate smart contract clause.

FIG. 6 is a flowchart of a method 600 of monitoring and enforcing smart contract compliance according to another embodiment. Method 600 can be performed by a system the same or similar to the system described in connection with FIGS. 3-5. Method 600 can begin with the formation of a smart contract. In block 602, the system generates a smart contract clause 555 with a processor communicatively coupled to a blockchain supported by a peer-to-peer network. The smart contract clause 555 is automatically invoked in response to a sensor-generated signal that corresponds to one or more predefined contract variance conditions. The system can embed the smart contract clause in a smart contract in the blockchain in block 604.

Optionally, method 600 can embed an invocation of the smart contract clause 555 in the blockchain if the smart contract clause is invoked. Additionally, if a plurality of contract variance conditions is predefined, then corresponding smart contract clauses can be generated, each clause corresponding to one of the contract variance conditions. Accordingly, method 600 also can optionally include invoking a specific corresponding clause depending on which of the plurality of contract variance conditions occurs.

Method 600 optionally can include automatically notifying at least one party to the smart contract if the smart contract clause 555 is invoked in response to an occurrence of a predefined contract variance condition.

FIG. 7 is a flowchart of a method of monitoring and enforcing smart contract compliance according to another embodiment. Method 700 can also be performed by a system the same or similar to the system described in connection with FIGS. 3-5. Method 700 can begin with the formation of a smart contract. In block 702 the system can generate a smart contract clause with a processor communicatively coupled to a blockchain in a peer-to-peer network. The smart contract clause 555 is automatically invoked in response to a sensor-generated signal that corresponds to one or more predefined contract variance conditions. The system embeds the smart contract clause in a smart contract in the blockchain at block 704.

In block 706, the system monitors activities and transactional events to determine whether a contract variance condition occurred. The system determines whether a contract variance condition has occurred at block 708. If a contract variance condition occurs, then at block 710 the system invokes the smart contract clause. Otherwise, method 700 loops back to block 706 to continue monitoring.

With method 700, determining whether a predefined contract variance condition occurred can include responding to a signal generated by a sensor that is located remotely from and operating independently of the peer-to-peer network. For example, in the context of the representative export-import transaction, the signal can be a GPS signal, an AIS transmission, or other location-indicating signal generated by a remote sensor. The signal can be conveyed directly to a peer node on which the system is executing, or the signal can be conveyed to the system over a network (e.g., LAN, WAN, the Internet). Depending on the form in which the conveyed signal is received, the system can convert the signal (e.g., analog-to-digital conversion) into a usable data format. In other embodiments, the signal is converted into a usable data format by a separate source that then conveys the data to the system.

Regardless of the particular form in which the signal is received by the system, the system analyzes the signal to determine whether a contract variance condition exists or has occurred. With respect to the representative export-import transaction, for example, the system can analyze received signals to track the vessel's voyage and compare detected activities (e.g., vessel's time at location, ships in the vessel's vicinity, vessel ports of call) with predefined contract conditions specified in the smart contract to automatically determine whether a contract variance condition exists or has occurred.

For example, if received signals reveal the geographical coordinates of the vessel, the system compares the coordinates with terms included in the smart contract to determine whether the vessel is in a location or port that contravenes the terms of the smart contract. If so, the system automatically invokes a corresponding smart contract clause. The smart contract clause can declare the carrier's contract breached and, for example, initiate a funds transfer to the aggrieved party.

In a particular embodiment, the system can include a timing and recordation mechanism to record the vessels location and the vessel's time at the location based on the received signals. Based on signal and timing analysis, the system can compare the time at the location with a threshold established by the parties. Time at a specific location that exceeds the threshold can indicate suspicious vessel activity that prompts the system to automatically invoke a corresponding smart contract clause. Invocation of the smart contract clause can initiate a notification and response request sent via the network to the carrier instructing the carrier to explain the reason for the vessel's suspicious activity. The transactions between the parties in resolving the issue are, as with other party transactions, automatically recorded as data blocks in the immutable blockchain.

In another embodiment, the system provides a data store (e.g., computer memory or other electronic data storage device) in which are stored contract variance conditions specified by the parties to the smart contract. The system receives sensor-generated signals (or data derived therefrom), which the system compares to each of the stored contract variance conditions specified by the parties. If the system's comparison reveals that a contract variance condition exists or has occurred, the system automatically invokes a corresponding smart contract clause. The stored data can include geographical coordinates corresponding to locations or ports that the parties agree the carrier's vessel is to avoid.

In still another embodiment, stored data can include a list of suspect vessels. The system can analyze location-indicating signals to determine whether the carrier's vessel is near a suspect vessel. If so, the system can automatically invoke a corresponding smart contract clause and initiate a request via the network asking the carrier to explain the vessel's suspicious activity.

In yet another embodiment, using the timing and recordation mechanism, the system also can determine whether the carrier's vessel has remained located suspiciously close to a vessel (whether listed as a suspect vessel or not) for a time that exceeds a predefined threshold, which can raise concern that the carrier's vessel is unloading cargo or taking illicit cargo aboard. If so, the system, can automatically invoke a corresponding smart contract clause and initiate a request via the network asking the carrier to explain the vessel's suspicious activity.

In one arrangement, the system utilizes artificial intelligence (AI) provided by an AI system configured to learn which signals correspond to which contract variance conditions specified by the parties. The AI correlates sensor-generated signals with predefined contract variance conditions, allowing the system to invoke an appropriate smart contract clause in response to a particular, signal-indicated contract variance condition. One such AI system is the Watson™ system that is available from the International Business Machines (IBM) Corporation of Armonk, N.Y. The Watson™ system is an application of advanced natural language processing, information retrieval, knowledge representation and reasoning, and machine learning technologies to the field of open domain question answering.

With respect to each of the various embodiments, method 700 can include periodically monitoring signals generated by the sensor. The frequency of monitoring, moreover, can be varied as dictated by a system user. Depending on the frequency utilized, the system can achieve real-time or near real-time monitoring and enforcement of a smart contract.

Transaction costs of negotiating, monitoring and enforcing contracts are often cited as an impediment to trade when parties that would otherwise readily engage in a mutually beneficial exchange are nonetheless reluctant to do so because of uncertainty about each other's reliability or reputation. Often, as in the case of international export-import transactions, for example, the parties are transacting over considerable distances and have no readily available mechanism for determining the reputation and reliability of a potential trading party. Even in the context of local transactions these concerns remain.

But conventional mechanisms involve their own transactions costs, namely, the costs of negotiating and documenting each of the party's rights and obligations under a contract or other legal instrument. A large part of the costs is associated with the issuing, handling, storing, exchanging, and managing physical documents. These costs can be significantly reduced by specifying the parties' contractual rights and obligations in a smart contract executing on a blockchain of a ledger running on a blockchain platform, which obviates the need for extensive physical handling of paper-based documents.

Concerns beyond contracting, however, extend to monitoring contract compliance since non-compliance can be costly, at least for some of the parties to a contract. Inventive arrangements disclosed herein extend blockchain technology by providing automatic mechanisms for monitoring and enforcing compliance with a smart contract.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein, That which is claimed is:

1. A computer-implemented method within a peer-to-peer network of monitoring a location of a vessel, comprising:
   generating, as a self-executing data structure associated with a contract variance condition, a smart contract clause of a smart contract;

embedding the self-executing data structure within a blockchain of a ledger running on a blockchain platform within the peer-to-peer network;

periodically receiving, from a sensor located remotely from the peer-to-peer network, location information of the vessel;

automatically invoking the self-executing data structure based upon a real-time evaluation of the contract variance condition against the location information, wherein the contract variance condition is an action that is agreed upon in advance as a breach or potential breach of the smart contract.

2. The method of claim 1, wherein the generating generates a plurality of self-executing data structures respectively associated with a plurality of different contract variance conditions.

3. The method of claim 1, wherein the sensor is independent of the peer-to-peer network.

4. The method of claim 1, wherein the contract variance condition is based upon the location information not being received.

5. The method of claim 1, wherein the contract variance condition is based upon the vessel being stationary at sea.

6. The method of claim 1, wherein the contract variance condition is based upon the vessel being positioned at a particular location.

7. The method of claim 6, wherein the contract variance condition is based upon a time of the vessel at the particular location.

8. A computer hardware system within a peer-to-peer network configured to monitor a location of a vessel, comprising:

a processor configured to initiate the following executable instructions:

generating, as a self-executing data structure associated with a contract variance condition, a smart contract clause of a smart contract;

embedding the self-executing data structure within a blockchain of a ledger running on a blockchain platform within the peer-to-peer network;

periodically receiving, from a sensor located remotely from the peer-to-peer network, location information of the vessel;

automatically invoking the self-executing data structure based upon a real-time evaluation of the contract variance condition against the location information, wherein the contract variance condition is an action that is agreed upon in advance as a breach or potential breach of the smart contract.

9. The system of claim 8, wherein the generating generates a plurality of self-executing data structures respectively associated with a plurality of different contract variance conditions.

10. The system of claim 8, wherein the sensor is independent of the peer-to-peer network.

11. The system of claim 8, wherein the contract variance condition is based upon the location information not being received.

12. The system of claim 8, wherein the contract variance condition is based upon the vessel being stationary at sea.

13. The system of claim 8, wherein the contract variance condition is based upon the vessel being positioned at a particular location.

14. The system of claim 13, wherein the contract variance condition is based upon a time of the vessel at the particular location.

15. A computer program product, comprising:

a computer readable storage medium having stored therein program instructions, the program instructions, which when executed by a computer hardware system within a peer-to-peer network configured to monitoring of monitoring a location of a vessel, cause the computer hardware system to perform:

generating, as a self-executing data structure associated with a contract variance condition, a smart contract clause of a smart contract;

embedding the self-executing data structure within a blockchain of a ledger running on a blockchain platform within the peer-to-peer network;

periodically receiving, from a sensor located remotely from the peer-to-peer network, location information of the vessel;

automatically invoking the self-executing data structure based upon a real-time evaluation of the contract variance condition against the location information, wherein the contract variance condition is an action that is agreed upon in advance as a breach or potential breach of the smart contract.

16. The computer program product of claim 15, wherein the generating generates a plurality of self-executing data structures respectively associated with a plurality of different contract variance conditions.

17. The computer program product of claim 15, wherein the sensor is independent of the peer-to-peer network.

18. The computer program product of claim 15, wherein the contract variance condition is based upon the location information not being received.

19. The computer program product of claim 15, wherein the contract variance condition is based upon the vessel being stationary at sea.

20. The computer program product of claim 15, wherein the contract variance condition is based upon the vessel being positioned at a particular location.

* * * * *